(12) United States Patent
Gimpel et al.

(10) Patent No.: US 11,486,973 B2
(45) Date of Patent: Nov. 1, 2022

(54) OPTOELECTRONIC SENSOR AND METHOD OF DEFLECTING A LIGHT BEAM

(71) Applicant: SICK AG, Waldkirch (DE)

(72) Inventors: Hartmut Gimpel, Waldkirch (DE); Thomas Russ, Waldkirch (DE)

(73) Assignee: SICK AG, Waldkirch (DE)

( * ) Notice: Subject to any disclaimer, the term of this patent is extended or adjusted under 35 U.S.C. 154(b) by 634 days.

(21) Appl. No.: 16/572,954

(22) Filed: Sep. 17, 2019

(65) Prior Publication Data

US 2020/0088849 A1 Mar. 19, 2020

(30) Foreign Application Priority Data

Sep. 19, 2018 (EP) ..................... 18195533

(51) Int. Cl.

| G01S 7/481 | (2006.01) |
|---|---|
| G01S 17/10 | (2020.01) |
| G02B 5/18 | (2006.01) |
| G02B 26/08 | (2006.01) |
| G02F 1/29 | (2006.01) |
| G02B 27/44 | (2006.01) |

(52) U.S. Cl.
CPC ............ G01S 7/4817 (2013.01); G01S 17/10 (2013.01); G02B 5/1828 (2013.01); G02B 26/0808 (2013.01); G02F 1/292 (2013.01); G02B 5/1823 (2013.01); G02B 27/44 (2013.01)

(58) Field of Classification Search
CPC ..... G01S 7/4817; G01S 17/10; G02B 5/1828; G02B 26/0808; G02B 5/1823; G02B 27/44; G02F 1/292
See application file for complete search history.

(56) References Cited

U.S. PATENT DOCUMENTS

| 10,156,725 | B2* | 12/2018 | TeKolste | ............ G02B 27/0081 |
|---|---|---|---|---|
| 10,914,950 | B2* | 2/2021 | Waldern | ............ G02B 27/0179 |
| 2011/0235865 | A1 | 9/2011 | Cheng et al. | |
| 2013/0155337 | A1 | 6/2013 | Sugiyama et al. | |
| 2018/0284440 | A1* | 10/2018 | Popovich | ............. G02B 6/0035 |
| 2018/0341139 | A1* | 11/2018 | Lentz | ................ G02F 1/133711 |

FOREIGN PATENT DOCUMENTS

| JP | 4269725 A | 9/1992 |
|---|---|---|
| JP | 2011209262 A | 10/2011 |
| JP | 2013195995 A | 9/2013 |
| WO | 2013014875 A1 | 1/2013 |

* cited by examiner

*Primary Examiner* — Ellen E Kim
(74) *Attorney, Agent, or Firm* — Nath, Goldberg & Meyer; Jerald L. Meyer

(57) ABSTRACT

An optoelectronic sensor is provided having a light receiver, a reception optics arranged upstream of the light receiver, and a control and evaluation unit, wherein the reception optics has a beam deflection device having a plurality of switchable blaze gratings of different grating constants arranged behind one another, and wherein the control and evaluation unit is configured to switch a blaze grating on and off in accordance with a desired deflection angle of the beam deflection device have the same grating constants, but a mutually different blaze angle.

15 Claims, 5 Drawing Sheets

OPTOELECTRONIC SENSOR AND METHOD OF DEFLECTING A LIGHT BEAM

Figure 1:
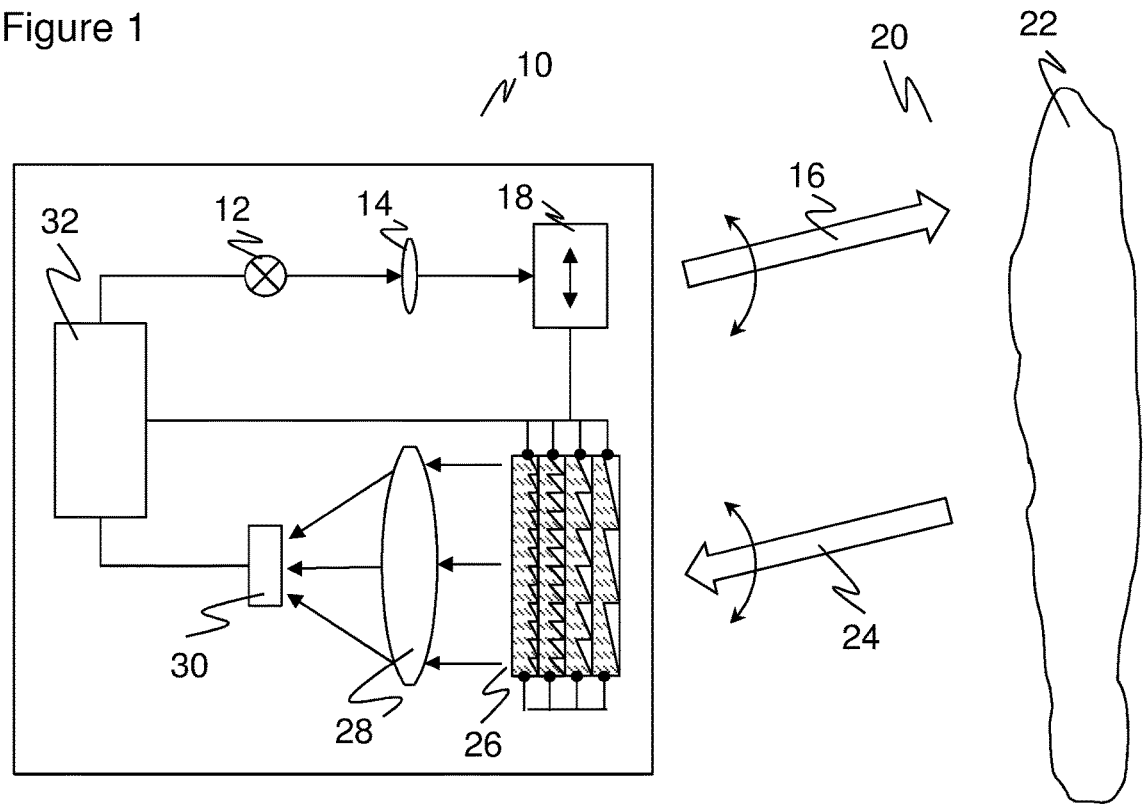

The invention relates to an optoelectronic sensor having a light receiver, a reception optics arranged upstream of the light receiver, and a control and evaluation unit, wherein the reception optics has a beam deflection device having a plurality of switchable blaze gratings of different grating constants arranged behind one another, and wherein the control and evaluation unit is configured to switch a blaze grating on and off in accordance with a desired deflection angle of the beam deflection device and to a method of deflecting a light beam having an arrangement one after the other of a plurality of switchable blaze gratings of different grating constants through which the light beam consecutively passes, wherein specific blaze gratings are switched on and off in accordance with a desired deflection angle of the light beam.

Optical scanning has long been used in laser scanners. A light beam generated by a laser periodically sweeps over the monitored zone with the aid of a deflection unit in this process and measures the respective distance from the scanned object using a time of flight process. In a pulse process, light pulses are transmitted for this purpose and the length of time between the time of transmission and the time of reception is measured. In a phase process, a periodic amplitude modulation and measurement of the phase offset between the transmitted light and the received light takes place. In addition to the measured distance information, the angular position of the deflection unit and thus of the object is determined and measured points having distance values and angular values in polar coordinates are thus produced after a scanning period. Three-dimensional measured points from a spatial region are generated by an additional variation or by multi-beam scanning at an elevation angle. The scanning admittedly requires a certain measurement time with respect to cameras, especially in the case of 3D detection, but the measurement is in turn concentrated on one point and thereby gains range and more reliable measured values.

In most laser scanners, the scanning movement is achieved by a rotating mirror or by a mirror wheel having a plurality of facets. It is, however, also known to instead have the total measurement head with one or more light transmitters and light receivers rotate, such as is described in DE 197 57 849 B4. In yet other systems, a deflection unit is pivoted to and fro or a lateral movement is produced by a bending mechanism, for example in US 2017/0307758. Any mechanical movement, however, results in a certain construction size and shock sensitivity and in servicing susceptibility as a result of wear.

To therefore avoid mechanical movement as much as possible, it is endeavored in the prior art to set up an area-scanning system without a rotating deflection unit. The pulsed transmitted light beam of a light source is conducted by an MEMS mirror in the X direction and in the Y direction over the surface to be scanned in EP 2 708 914 A1, for example. The reflected light pulses are received by a SPAD (single photon avalanche diode) matrix of which only those SPADs are respectively activated that observe the region currently illuminated by the transmitted light beam. The dispensing with of a rotating system is thus admittedly achieved. At the reception side, the system is, however, actually a camera and not a scanner since the light beams are not directly detected by a measured point, but rather the total scenery is imaged by an objective and is then only evaluated at points. In this respect, a respective one of several thousand or millions of pixels is responsible for a specific direction and, although the system is expensive and complex overall, the individual pixel necessarily tends to remain of less quality in view of the overall number.

In addition to the already named MEMS mirror, there are also other possibilities of deflecting the transmitted beam without any macroscopic scanning movement by means of a rotating mirror or the like, for instance optical phased arrays, acousto-optical modulators, electro-optical modulators, or liquid crystal waveguides, as in U.S. Pat. No. 9,366,938 B1. However, this all only works for small beam diameters that are typically only present at the transmission side. The previously known solutions are in contrast not suitable for a large reception optical path.

A further approach to deflect light beams is based on polarization gratings. They deflect right-handed or left-handed circularly polarized light in a respective different one of the two first orders of diffraction and a switchable variant permits the polarization gratings to be made selectively practically without function, that is to allow incident light in the zeroth order of diffraction to pass through in a straight line. A plurality of deflection angles can also be implemented by multiple arrangements of such polarization gratings. However, the efficiency for unpolarized light is always below 50% as a result of the function. However, polarization lattices above all have a very complex structure that makes them comparatively expensive because two to four respective layers of liquid crystal elements per polarization light gratings are required. For example, U.S. Pat. No. 8,982,313 B2 or US 2012/0188467 A1, and equally the papers of Buck, J., et al. "Polarization gratings for non-mechanical beam steering applications", Acquisition, Tracking, Pointing, and Laser Systems Technologies XXVI, Vol. 8395, International Society for Optics and Photonics, 2012, or Kim, Jihwan, et al. "Wide-angle nonmechanical beam steering using thin liquid crystal polarization gratings", Advanced Wavefront Control: Methods, Devices, and Applications VI, Vol. 7093, International Society for Optics and Photonics, 2008, deal with beam deflection through polarization gratings.

In addition to polarization gratings, there are also other switchable gratings whose diffraction function can therefore be activated and deactivated by electrical control. Electronically switchable Bragg gratings are used in WDM (wavelength division multiplex) systems in U.S. Pat. No. 6,567,573 B1. U.S. Pat. No. 6,587,180 B2 and the corresponding paper of Wang, Xu, et al. "Liquid-crystal blazed-grating beam deflector", Applied Optics 39.35 (2000): 6545-6555 use so-called switchable blazed gratings (blazed phase gratings) for the beam deflection. In a stack of blaze gratings, the grating constants respectively refined from blaze grating to blaze grating by a factor of two. A single order of diffraction that receives the main portion of the light is selected by selecting the switched-on blaze gratings.

The problem not recognized in U.S. Pat. No. 6,587,180 B2 in this respect is that the deflection angles of the individual blaze gratings do not simply sum, but rather that an optimization is only possible for a limited angle of incidence range. A selection of deflection angles over a large field of view is thus not possible or only possible with large errors. For such a grating can either be thin to cover a large range of accepted angles of incidence. However, this leads to a poor diffraction efficiency.

Conversely, a thicker grating has a better diffraction efficiency, but in turn a restricted range of accepted angles of incidence. Thus, for example, in accordance with Popovich, Milan, and Stephen Sagan "45.1: Application Specific Integrated Lenses for Displays", SID Symposium Digest of Technical Papers, Vol. 31. No. 1, Oxford, UK: Blackwell Publishing Ltd, 2000, an efficiency of approximately 80% is possible with an angle of incidence range of approximately ±10° and thus a field of view of only 20°.

The previously discussed switchable gratings are based on the use of liquid crystals. There are furthermore not only further switchable gratings with liquid crystals, but also other active principles without liquid crystals such as described in Li, Fudong, et al. "Near-infrared light-responsive dynamic wrinkle patterns", Science advances 4.4 (2018): eaar5762.

It is therefore the object of the invention to improve beam deflection with stacked switchable blaze gratings.

This object is satisfied by an optoelectronic sensor and by a method for deflecting a light beam in accordance with the respective independent claim respectively. The sensor has a light receiver having an upstream reception optics and a control and evaluation unit. In addition to possible typical elements for beam shaping and beam preparation, the reception optics comprises a beam deflection apparatus that represents the electronic equivalent of a conventional scanning mechanism. A plurality of switchable blaze gratings (blazed phase gratings) are provided in the beam deflection apparatus that are arranged behind one another and that are therefore also called a stack. The total received light preferably passes through the plurality of blaze gratings. However, this should by no means preclude a reflective arrangement of the beam deflection device in addition to a transmissive arrangement; the received light also passes through the different layers formed by the plurality of blaze gratings during reflection in the reflection case. The blaze gratings have different grating constants. The control and evaluation unit switches the respective blaze gratings on or off, that is diffractive or not diffractive, in accordance with the desired deflection angle. Every switched on blaze grating contributes to the deflection angle in dependence on its respective grating constant so that the control and evaluation unit can vary the deflection angle that results overall by selection of the switched on blaze gratings.

The invention starts from the basic idea of providing at least two blaze gratings having the same grating constant in the beam deflection device. Although the grating constants in the stack are therefore different, there is at least one grating constant that is represented at least twice. This appears superfluous at first glance since by switching in a single blaze grating having this grating constant, the corresponding change of the deflection angle having a granulation corresponding to this grating constant would already be possible; there is therefore no additionally achievable deflection angle. In fact, however, one blaze grating can actually not provide the contribution expected of it over all angles of incidence. This is satisfied in accordance with the invention in that two or more blaze gratings share the range of angles of incidence in that they vary among one another in the blaze angle with the same grating constant. The blaze angle here according to customary terminology is the intensity-optimized emergent angle in which the blaze grating deflects the incident light. This can in particular be the angle of a saw tooth-like structure of the blaze grating, but other gratings having a comparable effect are likewise understood as blaze gratings having a blaze angle.

The invention has the advantage that a settable deflection also becomes possible at the reception side without any mechanically movable parts, that is with a large aperture of a light beam and not only for small beam cross-sections as at the transmission side. A scanning system (solid state scanner) having good efficiency and a large scanning angle is thus produced. The possible aperture exceeds conventional solutions such as a MEMS mirror in the reception path and the performance and the range increase due to the larger reception aperture.

The setup is simplified with respect to a reception matrix and in principle only one photodetector is required, with a plurality of photodetectors remaining possible, for example for a plurality of scan beams or in a small SPAD (single photon avalanche diode) matrix with interconnected single SPADs. The complexity is considerably reduced with respect to the otherwise typical plurality of pixels, which also relates to the evaluation electronics and additionally reduces the heat development in the sensor. In addition, the few still required photodetectors can be considerably more complex and better in comparison with a single pixel of a large matrix, including the associated analog electronics, for instance by using an APD having a good preamplifier, or even analog-to-digital converters, which would not be representable in a matrix for many thousands of pixels. The signal-to-noise ratio and thus the characteristic values of the measurement such as range, extraneous light resistance, and the like are thus improved. Even an InGaAs detector for received light of a wavelength of 1550 nm is conceivable since its costs can still be accepted for a single detector, whereas an InGaAs matrix having a very large number of pixels and a large total surface can practically not be considered for cost reasons.

Finally, considerably less expensive grating stacks can be formed from blaze gratings in comparison with polarization gratings since one layer of liquid crystal material per grating can already be sufficient and two or even four layers are not required from the start. Since at least two blaze gratings of the same grating constants, but of different blaze angles are provided in accordance with the invention, the previous problem of a limited accepted range of angles of incidence is solved. Large deflection angles are therefore possible, thus also large fields of view (FOV) of 30° and more, without endangering diffraction efficiency.

The control and evaluation unit is preferably configured to switch on only a respective one of the blaze gratings having the same grating constants in dependence on the desired deflection angle. The two blaze gratings of the same grating constant are in principle provided for the same contribution to the deflection angle, that is redundantly to this extent in an ideal observation. In fact, however, only one of the different blaze angles is optimized for the specific angle of incidence the blaze grating should process and this blaze grating is switched on in this embodiment, while the other blaze grating or the other blaze gratings having the same grating constants are switched off. The blaze gratings having the same grating constants therefore share the range of desired deflection angles to be serviced overall and each of these blaze gratings is optimized and responsible for a specific partial angle range in that is exclusively actuated when a deflection angle of the beam deflection unit to be set falls in the respective partial angle range.

The respective grating constant is preferably a multiple of a base grating constant. All the blaze gratings of the beam deflection device therefore start from a common base grating constant. Lines per length are here required as the unit of the grating constant so that a grating having a multiple of the blaze grating constants becomes correspondingly finer. The possibility is produced by the relationship of the gratings over the base grating constant to vary the deflection angle in discrete angle steps corresponding to the base grating constant. With blaze gratings whose grating constants are in any desired relationship with one another, the most varied angle steps can also be combined that do not, however, have any directly recognizable order and sequence.

The grating constants are preferably in a ratio of $2^n$ to one another, where n is a natural number. Zero is also permitted; blaze gratings having this ratio have the same grating constants, as is provided in accordance with the invention for at least two blaze gratings. Otherwise, of two arbitrary blaze gratings, the one is respectively twice, four times, eight times, or actually $2^n$ times as fine as the other. A preferred arrangement occupies every n at least once so that as with a binary number every multiple of the smallest deflection up to the maximum possible deflection can be set by switching the blazing gratings on and off as deflection angles.

The control and evaluation unit is preferably configured to vary the deflection angle with an angular resolution over a reception angle range of the beam defection device. For this purpose, for example, all the combinations of switched on and switched off blazing gratings are run through. In the case of blaze gratings of the same grating constant, only that blaze grating is, preferably differently, always respectively activated that is better suited for the respective deflection angle. Depending on the configuration, in particular in the event of the already explained relationship $2^n$ (respectively $2^n$) of the grating constants by binary counting, a reception angle range having at least approximately equal steps can be run through from left to right in a similar manner to a mechanical scanner. In principle, however, the sequence of the deflection angles is negligible as long as only the measured values are correctly associated with the respective deflection angle. It is also possible to deviate directly from equidistant angle steps by the configuration of the blaze gratings and/or their switching. The relationship of the different On/Off configurations of the blaze gratings to a respective deflection angle can be determined in the control and evaluation unit by means of an algorithm or can, for example, be stored in a lookup table (LUT).

The light receiver is preferably a single detector. A light receiver that is of very high quality in comparison with a pixel of a matrix arrangement or complex electronic circuits for its control and preparation can be used thanks to the scanning principle. There is also the possibility of combining some few high quality or complexly interconnected reception elements to form the single detector, for instance to achieve certain statistics for increased robustness with respect to extraneous light events and dark events in the case of SPADs.

The reception optics preferably has a further beam deflection device having a plurality of switchable blaze gratings arranged after one another and having different grating constants among one another in an orientation of the blaze gratings crossed with respect to the beam deflection device. In other words, a second stack of blaze gratings in accordance with the invention is used as a further beam deflection, with all the options and configuration possibilities being available for both stacks. The two crossed stacks of blaze gratings enable a deflection in two directions for a 3D scan.

The beam deflection device is preferably oblique to a perpendicular or middle direction of incidence of received light. With a mechanical scanning mechanism, the natural selection of a reception angle range would be centered about the perpendicular direction of incidence at 0° so that the reception angle range, for example, is the interval [−30°, 30°]. This is, however, unfavorable for some shapes of blaze gratings that manage better with shallower deflection angles and then show better diffraction efficiency. The beam deflection is therefore arranged obliquely in this embodiment so that the reception angle range is displaced out of center and is for example centered about 40° at [10°, 70°]. Since the beam deflection device is accordingly set obliquely by 40°, the effective range of view of the sensor is again the same as in the case centered about 0°.

The beam deflection device preferably has at least one waveplate. The waveplates does not serve for diffraction or for light deflection, that is it should not contribute to the deflection angle. It rather only introduces a constant phase shift for the incident light beam, in particular in the form of a half-wave plate or a quarter-wave plate. The waveplate is preferably the topmost layer of the beam deflection device. The waveplate is switchable in a preferred embodiment. One measurement can then take place with and one without the effect of the waveplate, that is equal to a measurement with and without a polarization change.

The sensor preferably has a light transmitter and a transmission optics having a beam deflection device at the transmission side for transmitting a transmitted light beam at a desired deflection angle. An active solid state scanner is then produced by an equal control of the deflection angles at the transmission side and at the reception side. The beam deflection device at the transmission side is generally implemented in any desired technology, for instance by means of a MEMS mirror or another means already named in the introduction. It is also conceivable that the light transmitter has a plurality of light sources such as LEDs or VCSELs of which that one or those ones is/are respectively activated for the deflection angle or that the light transmitter already illuminates a whole row or surface.

The beam deflection device at the transmission side preferably has a plurality of switchable blaze gratings of different grating constants arranged behind one another. The same principle is thus used at the transmission side as at the reception side, with all the configuration possibilities described for the reception side also being conceivable.

The beam deflection device particularly preferably acts in a dual function as a beam deflection device at the transmission side. Not only the same principle is therefore used at the transmission side as at the reception side, but also the same stack of blaze gratings. This simplifies the setup and control and the deflection angles in this process are automatically suitably aligned and synchronously set at the transmission side and at the reception side.

The control and evaluation unit is preferably configured to determine a time of flight of the transmitted light beam transmitted and received again by the light receiver. The sensor thus becomes range finding, just as typically the classical laser scanners that can thus be replaced, at least in some areas of application, with a solid state scanner or a solid state LIDAR (light detection and ranging).

The method in accordance with the invention can be further developed in a similar manner and shows similar advantages in so doing. Such advantageous features are described in an exemplary, but not exclusive manner in the subordinate claims dependent on the independent claims.

Figure 2:
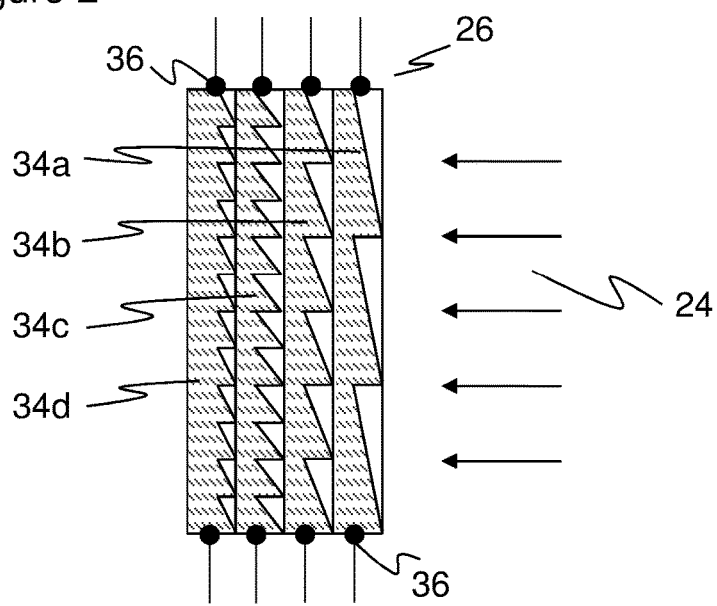
Figure 3:
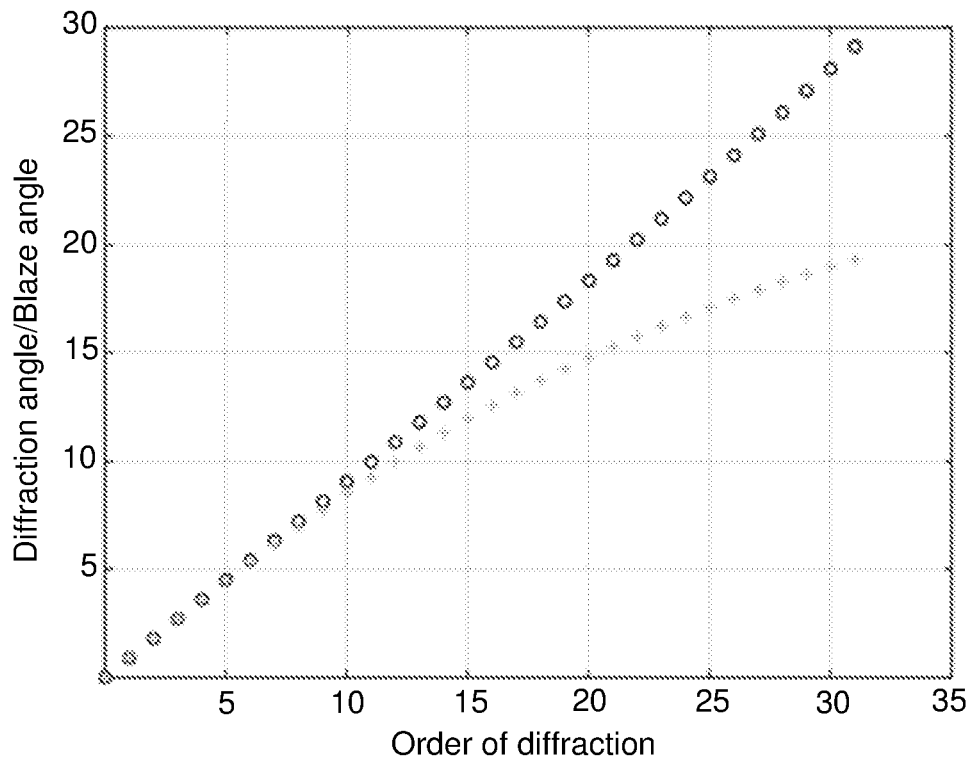
Figure 4:
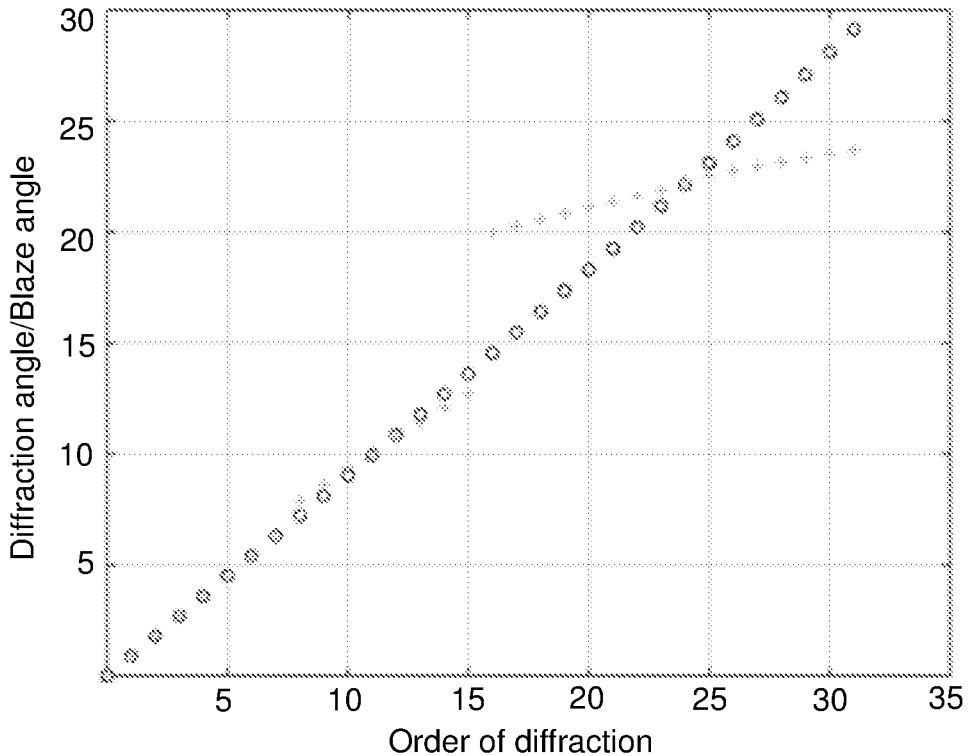
Figure 5:
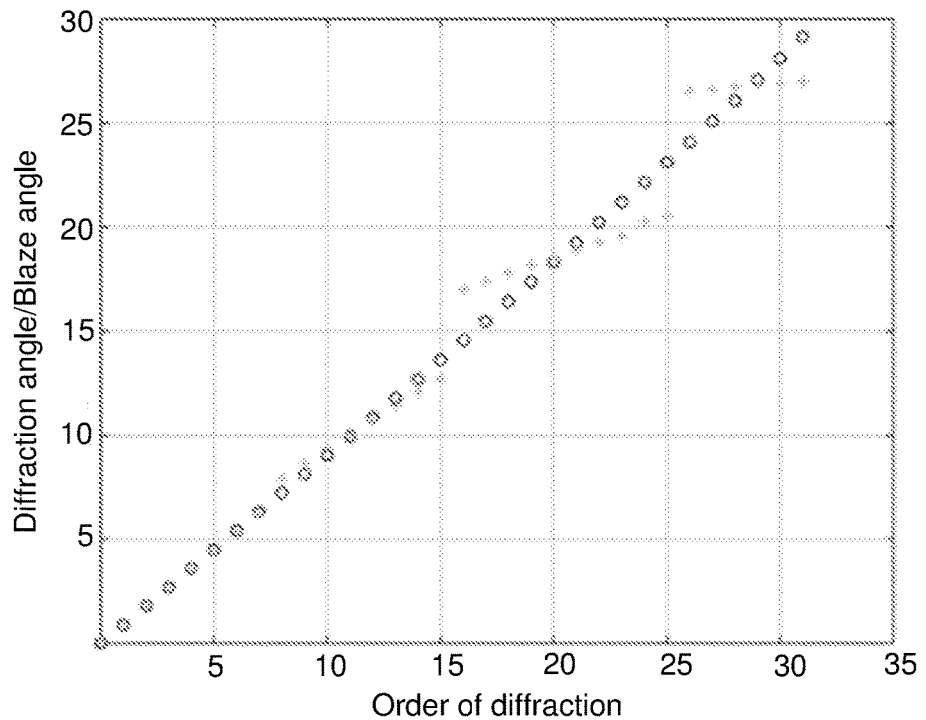
Figure 6:
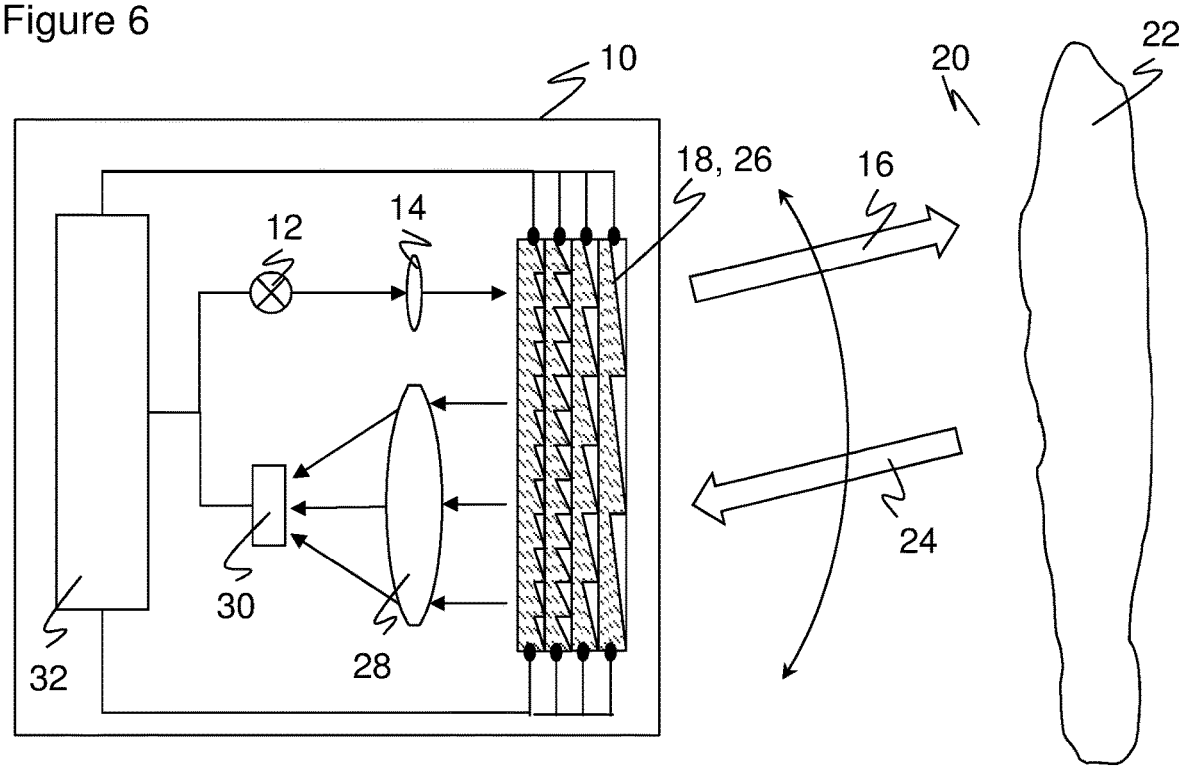
Figure 7:
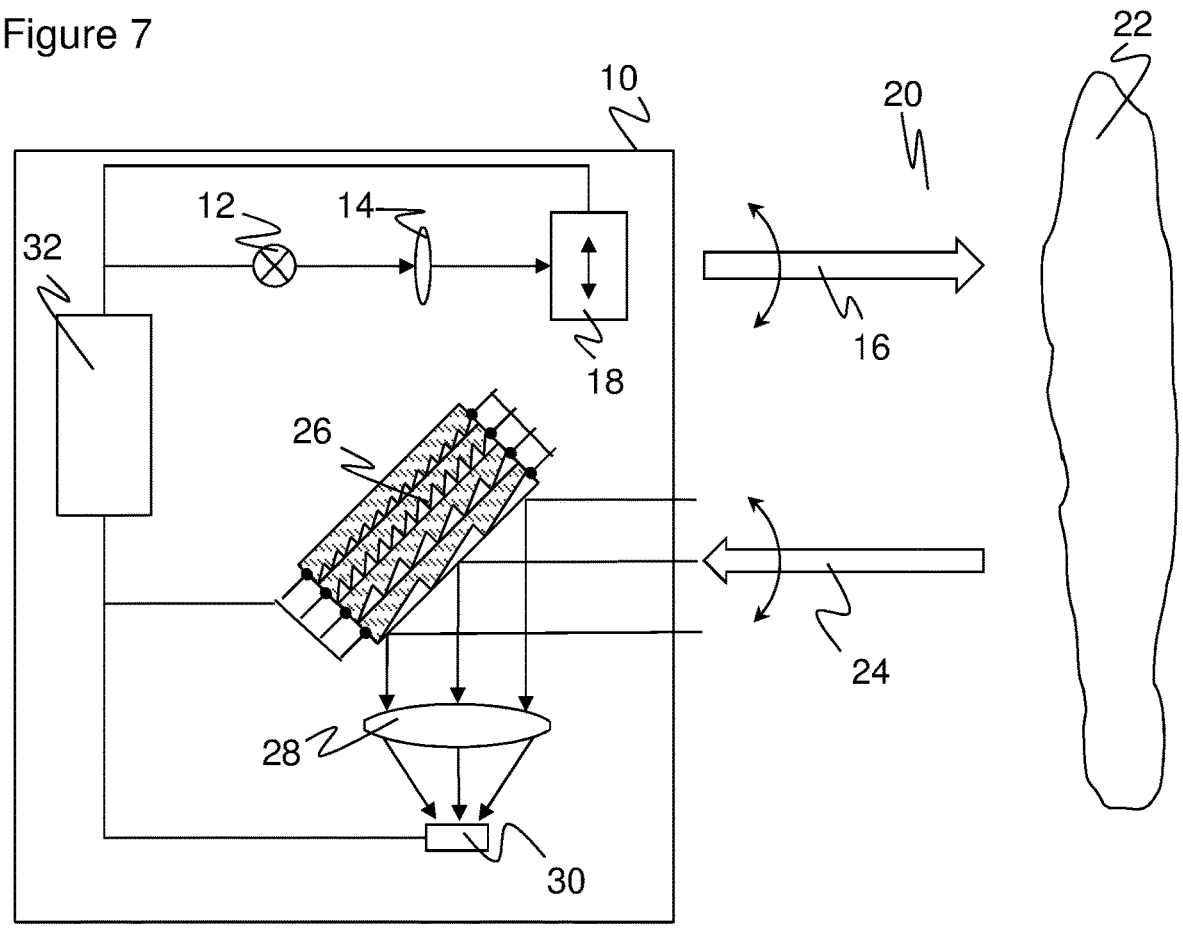
Figure 8:
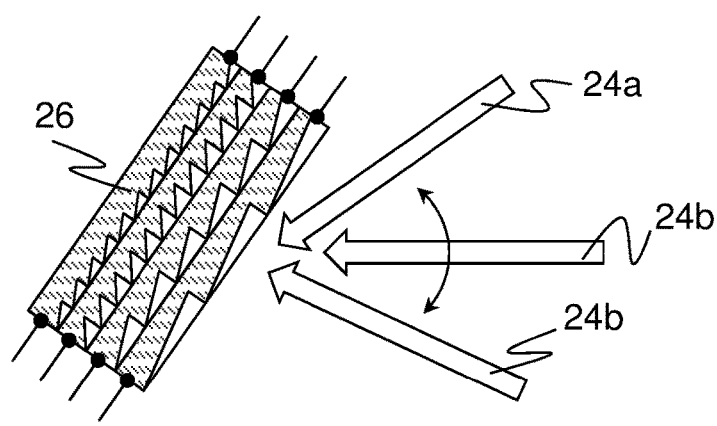
Figure 9:
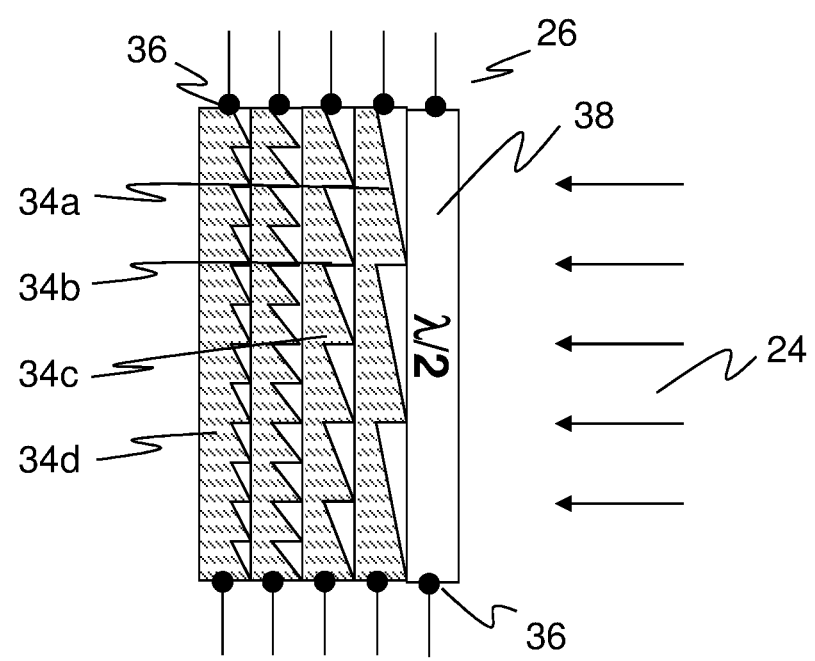

The invention will be explained in more detail in the following also with respect to further features and advantages by way of example with reference to embodiments and to the enclosed drawing. The Figures of the drawing show in:

FIG. 1 a schematic representation of an optoelectronic sensor with a beam deflection by means of stacked blaze gratings;

FIG. 2 a schematic representation of stacked blaze gratings of which at least two have the same grating constants, but different blaze angles;

FIG. 3 a comparative representation of the diffraction angle and of the blaze angle in dependence on the order of diffraction with conventional stacked blaze gratings;

FIG. 4 a representation similar to FIG. 3, but with an optimization of the blaze angles for the mean value of the deflection angles to which the respective individual blaze gratings actually contribute;

FIG. 5 a representation similar to FIG. 3, but on a use of stacked blaze gratings of which at least two have the same grating constants, but different blaze angles;

FIG. 6 a schematic representation of an optoelectronic sensor in which the stacked blaze gratings are also used for the beam deflection at the transmission side;

FIG. 7 a schematic representation of an optoelectronic sensor with the stacked blaze gratings in a reflective arrangement instead of a transmitting arrangement;

FIG. 8 a schematic representation of obliquely set stacked blaze gratings for an off-center displacement of the deflection angle range; and FIG. 9 a schematic representation of stacked blaze gratings with an additional waveplate.

FIG. 1 shows a schematic sectional representation of an optoelectronic sensor 10. A light transmitter 12 generates by means of a beam shaping optics 14 a transmitted light beam 16 that can be transmitted via a beam deflection device 18 at the transmission side in different directions into a monitored zone 20, as is indicated by an arrow. The beam shaping optics 14 that is only shown as representative as a simple lens forms a transmission optics together with the beam deflection device 18 at the transmission side. The light transmitter 12 can be configured as an LED or as a laser, in particular as a VCSEL laser or as an edge emitting laser diode.

If the transmitted light beam 16 is incident on an object in the monitored zone 20, a portion of the light returns as a remitted received light beam 24 to the sensor 10. A beam deflection device 26 at the reception side is set to the expected reception direction corresponding to the beam deflection device 18 at the transmission side and deflects the received light beam 24 at a suitable angle to a beam shaping optics 28. The received light beam 24 is bundled onto a light receiver 30 there. The beam shaping optics 28 that is only shown as representative as a simple lens forms a reception optics together with the beam deflection device 26 at the reception side. The light receiver 30 is, for example, a PIN diode, an APD (avalanche photo diode), or a single photon APD (SPAD), or a multiple arrangement thereof. The light receiver 30 can be connected to electronics, not shown, for instance to an analog preamplification, filtering, a downstream analog-to-digital converter, and the like.

The setup of the beam deflection device 26 at the reception side and its possible embodiments and variants will be explained in more detail below with reference to FIGS. 2 to 9. The purely schematically shown beam deflection device 18 at the transmission side can be based, depending on the embodiment, on the same principle and can even also make use of the beam deflection device 26 at the reception side or can use a different technique for beam deflection such as named by way of example in the introduction. In another respect, no scan mechanism also has to be present in the transmission path since a linear illumination or even an areal illumination is used. On the other hand, it is also conceivable to scan using a linear or areal illumination, for instance a light line perpendicular to its long axis. A passive system without its own light transmission is also conceivable.

A control and evaluation unit 32 controls the light transmitter 12 and the beam deflection devices 18, 26 at the transmission side and at the reception side and evaluates the received signal of the light receiver 30 to detect the object 22. The evaluation can take place in an analog and/or digital manner and can, for example, include a time of flight method to measure the distance from the object 22; for instance, a single pulse method, multi-pulse method, or phase method. The control and evaluation unit 32 is also representative for further possible electronic components of the sensor 10 that will not be looked at in any more detail.

The setup of the sensor 10 is only to be understood as exemplary. A scanner without any mechanically moving parts (solid state scanner) can be implemented by means of the beam deflection devices 18, 26. This can be associated with a distance measurement by means of a time of flight measurement such as explained, but alternatively other detections such as a simple object presence are equally possible. If, for example, a light transmitter 12 is not used with a dot-shaped beam cross-section, but if a moving laser line is produced, a distance measurement can also be implemented by triangulation or by a light sectioning process. These are also only examples for conceivable measurement processes in an optical scanner.

FIG. 2 shows a magnified representation of the beam deflection device 26 at the reception side. It has a plurality of blaze gratings 34*a-d* (blazed phase gratings) that are arranged sequentially to form a stack and are passed through by a received light beam 24 after one another. The blaze gratings 34*a-c* have different grating constants, but the two blaze gradings 34*c-d* have the same grating constants. In turn, the two blaze gratings 34*c-d* differ in blaze angles. In a preferred embodiment, as shown, the grating constants are each multiples of a base grating constant g0 whose unit is given in lines per length. A grating constant of k*g0 therefore means a k-fold finer grating. In a particularly preferred embodiment, the grating constants are selected in a $2^n$ sequence, n=0, 1, 2, 3, . . . , i.e. g0, 2g0, 4g0, 8g0, . . . .

As already stated, the last blaze grating 34*d* forms an exception since it has the same grating constant as the penultimate blaze grating 34*c*. The blaze gratings 34*c-d* of the same grating constants, however, do not necessarily have to be the last two gratings, nor do they have to directly follow one another. There can anyway also be three or more blaze gratings that have the same grating constants, but in each case a separate, mutually different blaze angle. More than one group having two or more blaze gratings of the same grating constants and two or more different blaze angles are equally conceivable.

In FIG. 2, the individual properties of the blaze gratings 34*a-d* are only purely symbolically indicated by their textures. The blaze gratings 34*a-d* each have connectors 36 via which they can be switched on and off, preferably individually, by the control and evaluation unit 32. A switched on blaze grating 34*a-d* has diffractive properties; a switched-off blaze grating 34*a-d* in contrast does not effect any deflection and allows the received light beam 24 to pass substantially unchanged.

The blaze gratings 34*a-d* can, for example, be composed of liquid crystals. In an embodiment, a respective transparent lens having a periodic prismatic structure is formed and a layer of liquid crystals is subsequently formed thereon in a similar manner to U.S. Pat. No. 6,587,180 B2 already named in the introduction. In an alternative design with liquid crystals similar to U.S. Pat. No. 6,567,573 B1, periodic layers of liquid crystal material are directly produced in a polymer.

To understand the functional principle of the beam deflection device 26 at the reception side, the mode of operation of a single blaze grating 34a-d will now first be explained very generally, then with reference to FIGS. 3 and 4 of a stack of blaze gratings with continuously different grating constants, and finally with reference to FIG. 5 of a stack of blaze gratings 34a-d in accordance with the invention that differ in blaze angles with mutually identical grating constants.

An efficient diffraction grating has to simultaneously monitor two angle conditions. On the one hand, the possible diffraction angles result from the periodicity of the grating or from the grating constant. In this respect, the grating equation determines the angles of all the possible orders of diffraction without making any statement on the light intensity there. Second, the design of a single element of this diffraction grating can be adapted, that is so-to-say the shape of the individual gap. For example, this individual element can be adapted such that it changes light very efficiently into one of the possible orders of diffraction, but not into any other order of diffraction. The angle of emergence optimized in intensity in this manner is called the blaze angle of the grating. One implementation option comprises forming a saw tooth-like structure that generates prisms in the individual gaps, with the prism angle then fixing the blaze angle.

If a plurality of blaze gratings are stacked, their combination can in turn in simplified form be considered as a common grating; that is all the blaze gratings of the tack are mentally merged to form the common grating. Since the individual blaze gratings of the stack are individually switched on and off, different common gratings are produced and the aim in accordance with the invention is that every possible or every used switching combination produces good efficiency, that is deflects as much received light 24 as possible in the desired direction. To simplify the trains of thought in the following, the common grating formed by the respectively switched on individual blaze gratings will be looked at for an incident received light beam 24 having an angle of incidence of 0°, with the respective individual gap in simplified form consisting of a prism that combines the accumulated diffraction effects and deflection effects symbolically at this point. In a simple model this can in particular be a common prism corresponding to the sum of the pitches of the contributing prisms of the individual blaze gratings.

So that the grating equation permits common values for the achievable orders of diffraction for all the possible combinations of individual blaze gratings, the respective grating constants are selected in whole number relationships. In this respect, there is a smallest grating constant g0 and in a staggered manner larger grating constants 2g0, 4g0, 8g0, and 16g0, with grating constants still being assumed in the unit lines per length and gratings having larger grating constants therefore being finer.

FIG. 3 shows which diffraction angles (small circles) and blaze angles (small crosses) result in the simplified model with summed prism pitches of the individual blaze gratings in the different orders of diffraction. The numerical values are each given as orders of diffraction for g0. The individual orders of diffraction are selected in that a respective different combination of individual blaze gratings are switched active. Corresponding to a binary number having five digits, 2^5=32 orders of diffraction or deflection angles are produced for five blaze gratings having the grating constants indicated in the preceding paragraph.

It can be easily recognized that the diffraction angle runs differently than the blaze angle for higher orders of diffraction and thus large deflection angles. If therefore the blaze grating having the smallest grating constant g0 is simply optimized and then multiplied and compressed accordingly for the larger grating constants, the blaze angle produced as a common grating by the stack no longer matches the diffraction angle for high orders of diffraction; the diffraction efficiency of the common grating therefore drops dramatically. This is in another respect due to the fact that the diffraction angle is caused by diffraction, the blaze angle in contrast by refraction. These two light phenomena scale differently on the accumulated effect or effective addition of a plurality of prisms.

The conclusion from FIG. 3 is that a stack of switchable blaze gratings having continuously different grating constants is unsuitable for large deflection angles and thus for a large scanning range or a large field of view of the sensor 10 because the light efficiency collapses as the deflection increases at the side. Such a stack of blaze gratings is therefore at best suitable for a small field of view <20° in which the losses can still be tolerated.

FIG. 4 illustrates a first conceivable improvement in a representation similar to FIG. 3. All the blaze gratings have previously been designed as the same, namely corresponding to the blaze grating of the smallest grating constant g0. The finer blaze gratings having greater grating constants are, however, not even used for all the orders of diffraction. A better approach is therefore an optimization to the average of those deflection angles at which the respective blaze grating is actually switched active. That would, for example, be the greater half of the deflection angles or the orders of diffraction 16 to 31 for the finest blaze gratings. If the finest blaze grating is optimized to this actual working range, the result shown in FIG. 4 is achieved. The difference between the diffraction angle and the blaze angle is already reduced, but as a maximum still amounts to approximately 6°.

FIG. 5 illustrates in a further representation similar to FIG. 3, the behavior of the common grating formed by the blaze gratings when a plurality of blaze gratings of the same grating constants are used with different blaze angles. In the specific example, the finest blaze grating is doubled. The optimization can thereby start at two points, in each case once per blaze grating of the same grating constant, whereby the one line of small crosses in FIG. 4 is divided into two considerably better adapted lines. Depending on which deflection angle is required, the control and evaluation unit 32 switches the one or the other blaze grating having the smaller difference active. The maximum difference between the diffraction angle and the blaze angle can thus again be considerably reduced, in the case shown to now a maximum of only approximately 2.5°. The diffraction efficiency is thereby, for example, considerably improved at 20% FWHM, as in the paper of Popovich et al. named in the introduction, namely from approximately 80% of the peak efficiency in accordance with its FIG. 2a to approximately 95%.

The representation in FIG. 5 is based on the following numerical example that also already produces the numerical values in FIGS. 3 and 4: The gratings are designed for a wavelength of the transmitted light beam 16 and in accordance with the received light beam 24 of 1550 nm. The smallest grating constant g0 is one line pair per 98.68 μm, which corresponds to a smallest deflection angle or to an interval between the orders of diffraction of 0.9°. The finest grating having the greatest grating constant 16g0 is provided double, but with a respective individually optimized blaze angle. The index jump of the mentally simplified prisms in the individual columns is $\Delta n=0.15$.

The following 5+1 blaze gratings, each with a grating constant g are therein:

g=g0 Contribution of deflection angle 1*0.9° Geometrical prism angle 6° g=2+g0 Contribution of deflection angle 2*0.9=1.8° Geometrical prism angle: 12° g=4+g0 Contribution of deflection angle 4*0.9=3.6° Geometrical prism angle: 23° g=8+g0 Contribution of deflection angle 8*0.9=7.2° Geometrical prism angle: 44° g=16+g0 Contribution of deflection angle 16*0.9=14.4° Geometrical prism angle: 74°, used for orders of diffraction up to 25 g=16+g0 Contribution of deflection angle 16*0.9=14.4° Geometrical prism angle: 86°, used for orders of diffraction 26 . . . 31

FIG. 6 shows a further embodiment of the sensor 10. The beam deflection device 26 of the reception path here simultaneously acts as a beam deflection device 18 at the transmission side. This not only saves components and controls, but the deflection angles at the transmission side are also automatically calibrated with respect to the deflection angles at the reception side. Differing from FIG. 6, it would also be conceivable to provide a separate beam deflection device 18 at the transmission side that is, however, of the same design as the beam deflection device 26 at the reception side, that is has a stack of switchable blaze gratings of which at least two have the same grating constants, but different blaze angles.

FIG. 7 shows a further embodiment of the sensor 10. In this respect, the beam deflection device 26 is reflective instead of transmitting, that is not a transmission grating as in the previous Figures and embodiments, but a reflection grating. The mode of operation and the design options correlate. Reflection gratings can deal more efficiently with different polarizations depending on the construction.

FIG. 8 shows a further embodiment of the sensor 10 in which the beam deflection device 26 and thus its blaze gratings 34a-d are obliquely arranged. This should not be confused with the arrangement in FIG. 7; in FIG. 8, the beam deflection device 26 is based on a transmission grating. Obliquely arranged does not, for instance, mean that a received light beam 24 is received from an oblique angle, which is almost always the case due to the varying deflection angles during a scan. The beam deflection device 26 is rather oblique to the reception angle range formed by the deflection angles. This reception angle range is determined by the received light beams 24a-b at a minimal and maximum deflection angle. A received light beam 24c central therein would not be incident perpendicular at an angle of incidence of 0° with a beam deflection device 26 not being oblique. The oblique beam deflection device 26 displaces this center. As a numerical example, the scanning angles do not vary between −30° and +30° with a centered center at 0°, but rather with an oblique beam deflection device 26 from 10° to 70° with a displaced center at 40°. This is advantageous for specific shapes of the blaze gratings to achieve high diffraction efficiencies. This has no external effect for the function of the sensor 10 overall because the deflection angle range can again be renamed to a range symmetrical about 0° with respect to a housing of the sensor 10 or the like.

FIG. 9 shows a design possibility of the beam deflection device 26 and thus also of the beam deflection device 18 at the transmission side if a stack of blaze gratings provides the defection there. The embodiment of FIG. 9 can be used for all the presented variants of the sensor 10.

In addition to the blaze gratings 34a-d, the beam deflection device 26 now has at least one waveplate 38, in particular a half-wave plate or also a quarter-wave plate. This can, for example, be implemented by planoparallel layers of liquid crystal material. The waveplate 38 is preferably the first layer impacted by the received light beam 24, but this arrangement in the stack of the blaze gratings 34a-d can also be varied. The waveplate 38 is, like the blaze gratings 34a-d, preferably also electrically switchable by controlling the control and evaluation unit 32. The waveplate 38 inter alia changes the direction of polarization of the received light beam 24. A measurement routine can thus then in particular be imagined in which first only one direction of polarization of the received light beam 24 is detected and then the other direction of polarization is detected in a second measurement pass after the switching over of the waveplate 38.

In the previous embodiments, the beam deflection device 26 only deflects the received light beam 24 in one direction. It is conceivable to provide a further beam deflection device in the optical reception path before or after the deflection device 26, said further beam deflection device being set up in a similar manner from a stack of blaze gratings having all the described embodiment possibilities, but with its grating structures being arranged crossed or rotated. Each of the two beam deflection devices is thus then responsible for one direction, that is, for example, the beam deflection device 26 for the X deflection and the further beam deflection device for the Y deflection. The concept of the blaze angle also has to be further expanded for such crossed arrangements since now every single blaze grating has to be adapted to an even more exhaustive range of angular incidence that can now even fluctuate in two spatial directions. Although each stack of blaze gratings therefore only carries out deflections in one spatial direction, the blaze gratings now have to be two-dimensionally modeled and optimized. It is particularly helpful for this purpose to have a plurality of blaze gratings of the same grating constants available to provide sufficient degrees of freedom for the optimization in two dimensions.

A three-dimensionally scanning sensor 10 can alternatively be set up by the movement of a light line instead of a light dot, with the light line than being moved perpendicular to its longitudinal extent. A further variant provides a plurality of light transmitters 12 and light receivers 30 to be able to work in parallel with a plurality of scanning beams and thus to reduce the time required for a total scan, with the individual scanning beams then preferably being encoded by a suitable modulation to avoid mutual influences.

The invention claimed is:

1. An optoelectronic sensor comprising:
   a light receiver,
   a reception optics arranged upstream of the light receiver, and
   a control and evaluation unit, wherein the reception optics has a beam deflection device having a plurality of switchable blaze gratings of different grating constants arranged behind one another, and wherein the control and evaluation unit switches a blaze grating on and off in accordance with a desired deflection angle of the beam deflection device,
   wherein at least two blaze gratings have the same grating constants, but a mutually different blaze angle.

2. The sensor in accordance with claim 1,
   wherein the control and evaluation unit switches only a respective one of the blaze gratings having the same grating constants in dependence on the desired deflection angle.

3. The sensor in accordance with claim 1,
wherein the respective grating constant is a multiple of a base grating constant.

4. The sensor in accordance with claim 3,
wherein the grating constants are in a ratio of 2^n to one another.

5. The sensor in accordance with claim 1,
wherein the control and evaluation unit varies the deflection angle with an angular resolution over a reception angle range of the beam defection device.

6. The sensor in accordance with claim 1,
wherein the light receiver is a single detector.

7. The sensor in accordance with claim 1,
wherein the reception optics has a further beam deflection device having a plurality of switchable blaze gratings arranged after one another and having different grating constants among one another in an orientation of the blaze gratings crossed with respect to the beam deflection device.

8. The sensor in accordance with claim 1,
wherein the beam deflection device is oblique to a central direction of incidence of received light.

9. The sensor in accordance with claim 1,
wherein the beam deflection device has at least one waveplate.

10. The sensor in accordance with claim 1,
that has a light transmitter and a transmission optics having a beam deflection device at the transmission side for transmitting a transmitted light beam at a desired deflection angle.

11. The sensor in accordance with claim 10,
wherein the beam deflection device at the transmission side has a plurality of switchable blaze gratings of different grating constants arranged behind one another.

12. The sensor in accordance with claim 11,
wherein the beam deflection device acts in a dual function as a beam deflection device at the transmission side.

13. The sensor in accordance with claim 1,
wherein the control and evaluation unit determines a time of flight of the transmitted light beam transmitted and received again by the light receiver.

14. A method of deflecting a light beam having an arrangement one after the other of a plurality of switchable blaze gratings of different grating constants through which the light beam consecutively passes, wherein specific blaze gratings are switched on and off in accordance with a desired deflection angle of the light beam, wherein only one of at least two blaze gratings of the same grating constants, but of mutually different blaze angles, is switched on in accordance with the deflection angle.

15. A method of optically scanning a monitored zone in which received light is consecutively received from different deflection angles, wherein the deflection angles are varied using a method of deflecting a light beam having an arrangement one after the other of a plurality of switchable blaze gratings of different grating constants through which the light beam consecutively passes, wherein specific blaze gratings are switched on and off in accordance with a desired deflection angle of the light beam, wherein only one of at least two blaze gratings of the same grating constants, but of mutually different blaze angles, is switched on in accordance with the deflection angle.

* * * * *